United States Patent [19]

Sidebottom

[11] 4,418,744
[45] Dec. 6, 1983

[54] AIR CONDITIONING CONTROL SYSTEM WITH USER POWER UP MODE SELECTION

[75] Inventor: Donald L. Sidebottom, Louisville, Ky.

[73] Assignee: General Electric Company, Louisville, Ky.

[21] Appl. No.: 365,766

[22] Filed: Apr. 5, 1982

[51] Int. Cl.³ .................... F25B 29/00; H03K 17/00
[52] U.S. Cl. ........................... 165/25; 62/164; 328/152
[58] Field of Search ............... 165/25, 27, 11 R, 43; 62/163, 164; 307/296 R; 328/152; 219/508

[56] References Cited

U.S. PATENT DOCUMENTS

| | | | |
|---|---|---|---|
| 3,508,253 | 4/1970 | James | 328/48 |
| 3,597,629 | 8/1971 | Bartlett | 307/238.3 |
| 3,771,130 | 11/1973 | Moses | 328/152 X |
| 3,777,187 | 12/1973 | Kohn | 307/296 X |
| 4,001,609 | 1/1977 | Sickert | 328/48 |
| 4,011,436 | 3/1977 | Schiller | 328/48 |
| 4,036,431 | 7/1977 | Gidlof | 328/48 |
| 4,232,236 | 11/1980 | Yomogida et al. | 307/296 R X |
| 4,260,907 | 4/1981 | Winebarger | 328/48 |
| 4,287,939 | 9/1981 | Pohl et al. | 236/51 |

Primary Examiner—William E. Wayner
Attorney, Agent, or Firm—Frank P. Giacalone; Radford M. Reams

[57] ABSTRACT

A user-operable power-up mode switch included within an electronic air conditioning mode control circuit of the type including momentarily-actuated user mode selection switches and a volatile mode selection memory. In the event of power interruption, the mode selection memory "forgets" the last selected mode after a relatively short time when power supply filter capacitors have discharged. The power-up mode switch allows user selection of the particular mode in which operation resumes upon power restoration, but the user power up mode selections do not include all the operational modes selectable by the momentarily-actuated user mode selection switches. Thus operation continues in a mode at least appropriate for the season.

5 Claims, 2 Drawing Figures

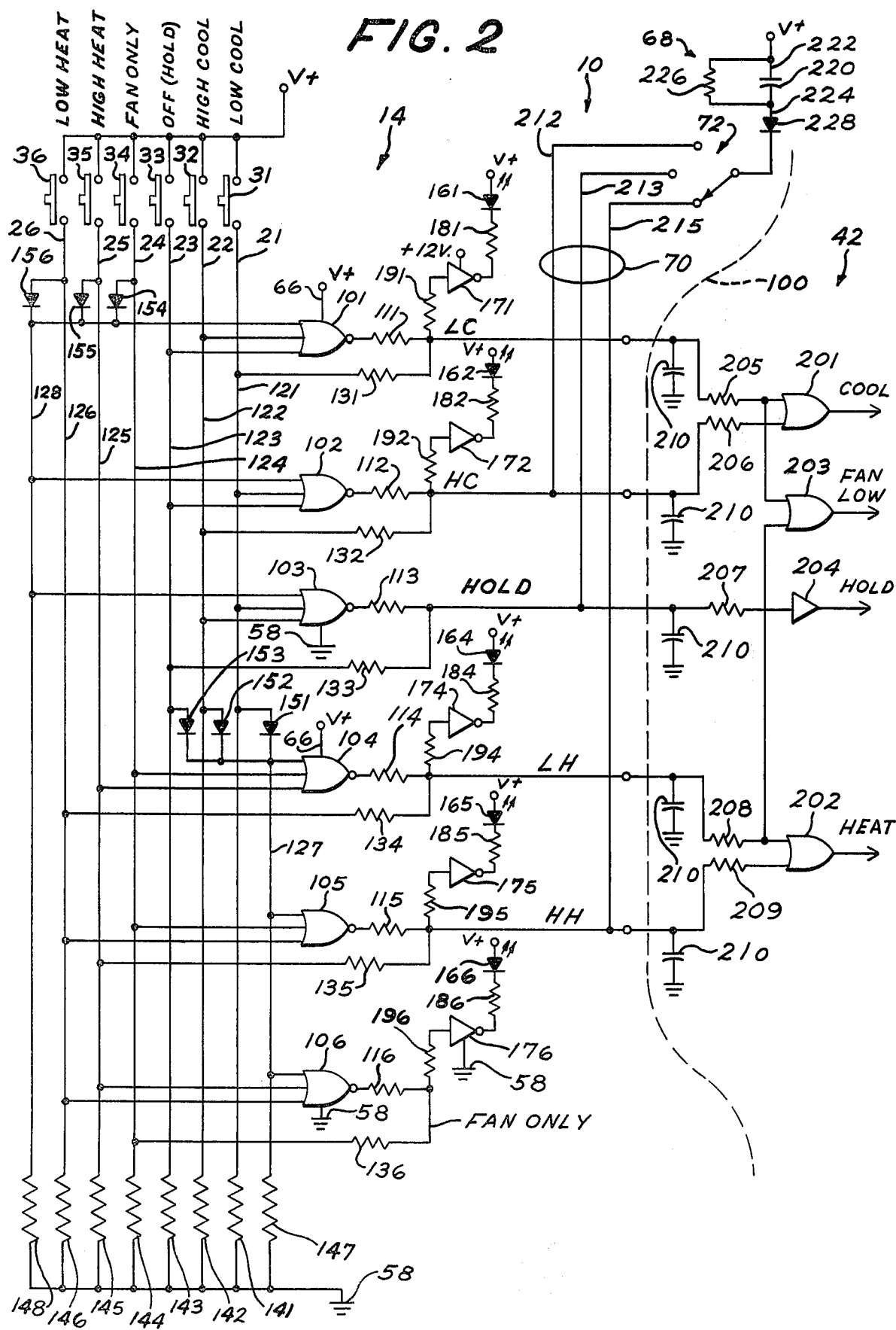

AIR CONDITIONING CONTROL SYSTEM WITH USER POWER UP MODE SELECTION

BACKGROUND OF THE INVENTION

The present invention relates to control systems for multiple mode air conditioning units and, more particularly, to electronic mode control circuits of the type including momentarily actuated user mode selection switches and a volatile mode selection memory.

One form of air conditioning unit is sized for an individual room, and typically has local controls for both operational mode and temperature. A typical complement of operational modes is "High Fan Speed Heat", "Low Fan Speed Heat", "High Fan Speed Cool", "Low Fan Speed Cool", "Fan Only", and "OFF". From this listing of typical modes, it will be appreciated that the term "air conditioning" is employed herein in a broad sense to mean any form of unit which alters the characteristics of room air, for example, by either heating, cooling or both.

For selecting these various modes, at least two general forms of selector switching arrangements have heretofore been employed.

The first form of mode selector switching arrangement is an electromechanical switch. There are two common configurations of electromechanical switches: rotary detent-type switches; and interlocked mechanical push-button switches with exclusive selection capability arranged such that, when a desired selection push-button is depressed to complete a circuit to effect the particular function desired, all of the remaining push-buttons automatically pop up. Being mechanical in nature, an electromechanical type selection switch, once placed in a particular mode selection, in effect "remembers" that mode selection until moved to a different selection.

The second form of mode selector switching arrangement is electronic in nature, and is advantageously employed in combination with comprehensive electronic control systems which have recently come into use for such air conditioning units. It will be appreciated that electronic mode selection switching systems can be designed with a minimal number of moving parts, and are generally recognized as having greater long term reliability than electromechanical switches. Moreover, momentary "touch" switches of the deformable "membrane" type employed in electronic mode selector switching arrangements have a number of advantages in addition to reliability, including pleasing appearance and relatively low cost.

One example of an electronic mode selection circuit for an air conditioning system is described in commonly-assigned Pohl et al U.S. Pat. No. 4,287,939. This Pohl et al patent describes electronic momentary push-button and holding circuitry applied to the control of air conditioning units. To electronically provide a function similar to that of the electromechanical push-button configurations wherein only one push-button is actuated at a time, with actuation of any one push-button mechanically de-actuating all others, the electronic system employs momentary contact single pole switching elements, with electronic circuitry providing the holding function to keep a selected circuit or mode energized even after the user has released a push-button. Advantageously, the complexity required to mechanically interlock selector switches is eliminated. While a typical single pole switching element is a membrane "touch" switch, capacitive-type "touch" switches may as well be employed. In either event, it will be appreciated that the mode of operation is held or "remembered" by the electronic latching circuit, and not by mechanical elements of the switch itself.

A disadvantage, however, of such electronic latching circuitry relates to the manner in which they are powered, which is typically through a power supply circuit in turn supplied from a conventional AC branch circuit. Such a power source, while generally reliable, is nevertheless subject to interruption. In the event of a power interruption, the electronic circuitry typically unlatches. Thus, it "forgets" its mode of operation. Upon restoration of power, operation does not necessarily resume in the last mode actually selected by the user. Such latching circuitry is conventionally termed a "volatile" electronic memory because the stored information or data is lost when power is removed. While "non-volatile" electronic Random Access Memories (RAM's) are available, it is either impossible to change the stored information, as in the case of a Read Only Memory (ROM), or difficult, as in the case of an Electrically Programmable Read Only Memory (EPROM), or the memories are expensive and require relatively complex circuitry, as in the case of an Electrically Alterable Read Only Memory (EAROM).

It is common to include in electronic control circuits in general a "power on reset" circuit which forces the control circuit into a particular mode of operation when initially powered up, and also following power interruption. While such a power on reset circuit might be applied to an air conditioning control, most likely to reset the control to an "OFF" condition, there is no assurance that an appropriate mode of operation would occur upon resumption of operation. This is particularly a problem where the room user is away from the room for a period of time and, upon return following a power interruption and subsequent restoration, finds the room either excessively hot or excessively cold, depending upon the season.

It will be appreciated that typical DC power supplies include storage capacitors for the purpose of filtering rectified DC voltage and that these capacitors also prolong voltage supply to the mode memory circuit in the event of a power failure. In some cases, additional storage capacitors may be included in the circuit to maintain energization to selected circuit portions in the event of a power outage. However, such measures are only effective for a limited period of time. Such measures may well be effective to avoid loss of mode memory during short power interruptions, but not during prolonged power interruptions.

Another related approach is to connect a standby battery to maintain memory energization in the event of power failure. While this is an effective approach, it is relatively costly and, at some point the battery will need to be replaced, even if it is a rechargeble one. This is undesirable from a practical standpoint in an air conditioning unit supplied from a standard AC power source and expected to perform in a trouble-free and substantially maintenance-free manner for a number of years.

SUMMARY OF THE INVENTION

Accordingly, it is an object of the invention to provide a means wherein an electronic mode control system of the general type described above resumes operation in an appropriate mode following loss and subsequent resumption of power.

It is a further object of the invention to provide such a means which does not in any way affect circuit operation under normal conditions in the absence of power failure.

Briefly, and in accordance with an overall concept of the invention, a control system of the type described above includes a user-operable power-up mode switch which allows user selection of the particular mode in which operation resumes following power failure and restoration. The user power-up mode selection switch is an electromechanical switch, typically a two or three position rotary switch, and thus mechanically "remembers" the particular power up mode selected. In order that the user power up mode selection switch provide a useful function, but as not be as complicated and thus as costly as a conventional mode selection switch, the user power up mode selections do not include all of the operational modes. For example, in an air conditioning control system having "High Fan Speed Cool", "Low Fan Speed Cool", "High Fan Speed Heat", "Low Fan Speed Heat", "Fan Only", and "OFF" modes of operation, the user power-up mode selection switch in one form of the invention allows selection from among only three of these modes, one cooling mode, one heating mode, and the OFF mode. A specific example is selection from among the "High Fan Speed Cool" mode, the "High Fan Speed Heat" mode, and the "OFF" mode.

Thus, during warm seasons or in warm climates, the user power up mode selection switch would be left in the "High Cool" position. Upon power interruption and subsequent restoration, operation of the air conditioning unit would resume in at least an appropriate operational mode, although not necessarily the precise mode last selected by the user prior to power interruption. Similarly, during cool seasons or in cooler climate, the user power up mode selection switch would be set in the "High Fan Sped Heat" mode.

Briefly, and in accordance with a more particular aspect of the invention, an electronic control system is provided for an air conditioning unit having a plurality of operational modes. The control system is adapted for operation from a power source subject to interruption. The control system includes a volatile mode selection memory capable of storing representations corresponding to each of the operational modes. The volatile mode selection memory has mode selection inputs responsive to momentary actuations, such as through membrane "touch" switches, or the like. In order to effect operation of the air conditioning unit in the mode corresponding to any particular stored representation, an operative connection is provided between the memory and the air conditioning unit.

The electronic control system of the invention also includes a power on reset circuit connected to the mode selection memory and arranged to cause the air conditioning unit to resume operation in the particular selected mode upon restoration of power following a power interruption. A user-operable power-up mode selection switch is connected to the power on reset circuit for allowing user selection of the particular mode in which operation resumes. The user power up mode selections include at least a plurality of the total number of operational modes.

Preferably, the user power up mode selections do not include all of the operational modes, as summarized hereinabove.

In one particular implementation, the electronic control system includes a circuit conductor defining a circuit reference potential, which, for example, is a positive DC voltage supply line. The volatile mode selection memory includes an input corresponding to each of the user power up selections. Each of these inputs is effective, when connected to the circuit reference potential conductor, to cause operation in the corresponding user power up mode selection. The power on reset circuit includes a capacitor having one terminal connected to the circuit reference potential conductor, and the user operable power up mode selection switch selectively connects the other capacitor terminal to the memory inputs corresponding to the user power up mode selections such that, upon restoration of power, the capacitor, serving as an electronic differentiator, momentarily effectively connects a selected power up mode selection input to the circuit reference potential.

Significantly, this power on reset circuit and the user operable power up mode selection switch have no effect on the remainder of the control system when there is no power interruption. All controls operate normally.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2 is an electrical schematic diagram of one form of electronic control system in accordance with the invention.

DETAILED DESCRIPTION OF THE PREFERRED EMBODIMENT

Figure 1:
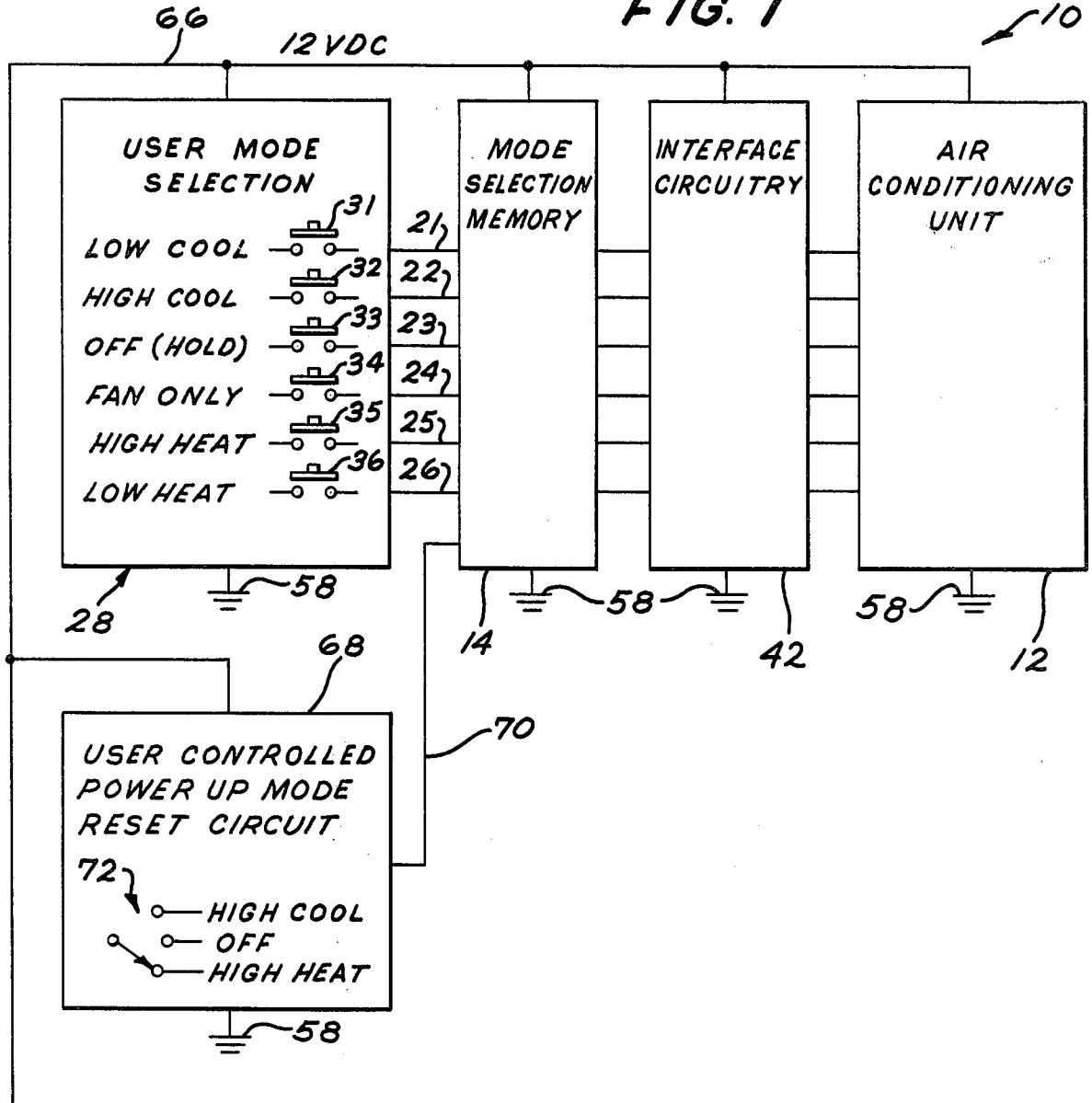
FIG. 1 is an overall block diagram of one form of electronic control system and air conditioning unit in accordance with the invention.
Figure 1:
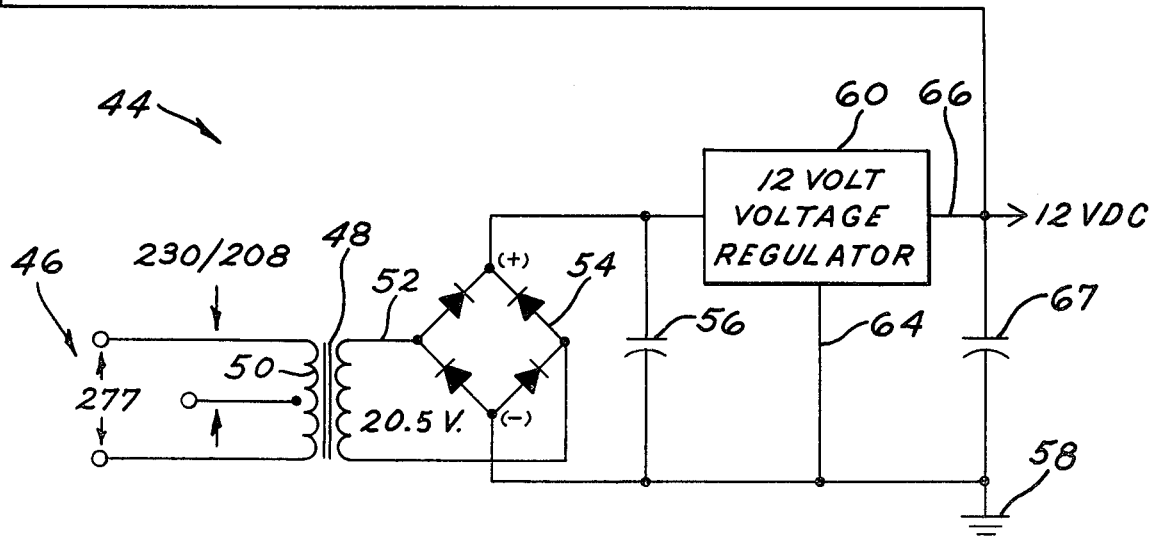

FIG. 1 depicts an electronic control system 10 for an air conditioning unit 12 having a plurality of operational modes. The air conditioning unit 12 may take a variety of forms and there is accordingly no intention to limit the present invention for use in combination with any particular such unit other than as set forth in the appended claims. As one example the unit 12 is a room sized unit and includes an air cooling subsystem (not shown) comprising a closed circuit refrigeration system having a refrigerant evaporator in heat exchange relationship with a fan-force recirculating indoor air flow, and a separate heating subsystem (also not shown) comprising electrical resistance heaters. As another example, the closed circuit refrigeration system may be reversible and comprise what is conventionally termed a "heat pump" to provide heating as well as cooling, with the electrical resistance heaters being required only for supplemental purposes. Also, a reversible air valve heat pump may be employed, wherein the evaporator and condenser retain their usual functions relative to the closed circuit refrigeration system, but indoor and outdoor air flows are selectively alternatively directed over the evaporator and condensor. Typical such air conditioning units include a motordriven fan (not shown) operable in both High and Low Fan speeds. Such a fan is employed during heating and cooling modes of operation to recirculate air over the heat exchanger. Such a fan is also employed during a "Fan Only" mode simply for ventilation purposes.

The air conditioning unit 12 thus may be any type of unit for which mode selection control is desired. In particular, by way of example and not by way of limitation, the unit 12 is capable of a low fan speed cooling mode, hereinafter termed "High Cool", a low fan speed heating mode, hereinafter termed "Low Cool", a high fan speed cooling mode, hereinafter termed "Low Heat", a high fan speed heating mode, hereinafter termed "High Heat", a "Fan Only" mode for ventilation purposes, and a "HOLD" mode. The "HOLD" mode may be compared to what is normally termed "OFF" mode in that the heating, cooling and air circulation elements of the unit 12 are all de-energized. However, in the "HOLD" mode the electronic control circuits remain energized. The particular way in which these modes are implemented within the air conditioning unit 12 will of course depend upon the particular form of air conditioning unit, and as will be appreciated by those skilled in the art, may be implemented through suitable transistor, integrated circuit, comparator, and/or relay arrangements, appropriate to the particular form of unit 12.

The FIG. 1 electronic control system 10 additionally includes a volatile mode selection memory 14 capable of storing representations corresponding to each of the operational modes. A typical such mode selection memory 14 includes an electronic latching circuit, of which various forms are known, as will be appreciated by those skilled in the art.

The mode selection memory 14 has a plurality of mode selection inputs 21–26 responsive to momentary actuations. These momentary actuations are provided by a user mode selection switching unit 28, comprising individual momentary push-button switching elements 31–36 corresponding to the various operational modes. The momentarily actuable switching elements 31–36 are preferably membrane "touch" switches. Such "touch" switches may take a variety of specific forms, and the following U.S. patents are identified by way of example for their disclosures of various forms of membrane "touch" switches: Sudduth U.S. Pat. No. 3,699,294; Larson Pat. Nos. 3,998,511, 3,995,126 and 4,034,176; Johnson et al Pat. No. 4,046,981; and commonly-assigned Pohl et al Pat. No. 4,287,939. Alternatively, the switching elements 31–36 may comprise capacitive-type touch switches with associated circuitry. One example of a capacitive-type touch switch is disclosed in the Pohl et al U.S. Pat. No. 4,287,939.

Interposed between the mode selection memory 14 and the air conditioning unit 12 is interface circuitry 42 appropriate for the particular form of air conditioning unit 12. The interface circuitry 42 preferably comprises a portion of a comprehensive electronic cntrol circuit for the air conditioning unit 12, and, as an electronic control, includes various forms of digital logic devices.

The electronic control system 10 operates from a power source, generally designated 44, which is subject to interruption. More particularly, the power source 44 supplies an exemplary +12 VDC and operates from a conventional AC branch circuit represented at 46. For purposes of example only, the branch circuit 46 supplies 277 VAC.

The power supply 44 includes a step-down transformer 48 having a primary winding 50 appropriate for the AC supply voltage or for a range of supply voltages, and a 20.5 VAC secondary winding 52 connected to a full wave bridge rectifier 54. Connected across the (+) and (−) outputs of the bridge rectifier 54 is an input filter capacitor 56. The (−) terminal of the bridge rectifier 54 is connected to circuit ground 58. For providing regulated +12 VDC, a conventional three-terminal monolithic integrated circuit 12-Volt voltage regulator 60 has its input terminal 62 connected to the (+) output of the bridge rectifier 54 and its reference terminal 64 connected to circuit ground 58. The voltage regulator 60 output line 66 supplies the +12 VDC conductor, and output filter and stabilizing capacitor 67 is connected to the regulator 60 output.

The +12 VDC supply line 66 supplies power to the various elements of the FIG. 1 control system 10.

The mode selection memory 14 is a volatile memory, and in the event of power interruption of sufficient duration, "forgets" the selected mode as soon as the storage capacitors 56 and 67 have discharged. In accordance with the invention, a user controlled power-up mode reset circuit 68 is provided, and connected to the mode selection memory 14 via a representative connection 70. The user-controlled power-up mode reset circuit 68 is arranged to cause the air conditioning unit 12 to resume operation in a particular selected mode upon restoration of power following a power interruption. The power on reset circuit 68 includes a user-operable power-up mode selection switch 72 for allowing user selection of the particular mode in which operation resumes. The user power up mode selections include at least a plurality of the operational modes but, preferably, not all of the operational modes. In the illustrated embodiment, the user power up mode selections are "High Cool", "OFF", and "High Heat".

Referring now to FIG. 2, there is illustrated a detailed schematic diagram of one particular form of electronic control system 10 in accordance with the invention. A dash line 100 somewhat arbitrarily separates elements comprising the electronic control system 10 on the left side from elements comprising the interface circuitry 42 on the right side. It will be appreciated that the actual interface circuitry 42 depicted is representative only, comprises merely a portion of that which is required in a complete system, and is highly dependent upon the details of the particular air conditioning unit 12 employed.

In FIG. 2, the mode selection memory 14 of FIG. 1 may more particularly be seen to comprise a digital logic circuit including CMOS digital logic devices in an interconnected latching arangement. In particular, the mode selection memory 14 comprises six three-input NOR gates 101–106. By way of example, these NOR gates 101–106 are included within a pair of Type No. 4025 triple three-input NOR gate integrated circuit packages. (It will be understood that the specific component designations and values identified herein are given by way of example only to enable those skilled in the art to practice the invention without undue experimentation, and are not in any way intended to limit the scope of the invention.) The three gates 101–103 are included within one package, and together are supplied from the +12 VDC supply line 66, shown connected to the gate 101, and from circuit ground 58, shown connected to the gate 103. Similarly, the three gates 104–106 are included within another integrated circuit package supplied from the +12 VDC line 66 and circuit ground 58.

The six NOR gates 101–106 are interconnected in an interlocking and latching circuit. In the particular circuit illustrated, the logic is such that the output of only one of the NOR gates 101–106 is high at any one time, corresponding to the particular mode selected. The outputs of all other, non-selected, NOR gates 101-106 are low. The interconnected latching circuit maintains the NOR gates 101-106 in a particular selected state until changed by subsequent selection or until the occurrence of a power outage of sufficient duration to discharge the power supply storage capacitors 56 and 67 (FIG. 1).

The FIG. 2 memory circuit 14 includes five output lines LC, HC, HOLD, LH and HH connected to the FIG. 1 air conditioning unit 12 through the interface circuitry 42, these output lines extending respectively from the NOR gates 101-105. There is no corresponding output for the "Fan Only" NOR gate 106 inasmuch as the logic of the particular interface circuitry 42 and air conditioning unit 12 depicted does not require a specific line for "Fan Only". Rather, "Fan Only" mode is indicated by the absence of any other mode selection signals, including the absence of the "HOLD" mode.

The six NOR gates 101-106 are arranged to produce interlocking and latching functions, and to accept inputs both from the user mode selection switches 31-36 and from the power on reset circuit 68. Considering the specific circuitry, connected in series with the outputs of the NOR gates 101-106 are corresponding current-limiting resistors 111-116 each, for example, having a resistance of 10K ohm. From the resistors 111-116, the output of each of the NOR gates 101-106 is connected back in an unlatching configuration to an input of each of the other NOR gates 101-106, but not to one of its own inputs. As a result, when any one particular NOR gate circuit 101-106 is selected and is activated (defined as a logic high output in this system), all of the other NOR gates 101-106 have their outputs at logic low. With the outputs of all the other NOR gates 101-106 at logic low, and connected to inputs of the particular selected NOR gate 101-106, the output of the one NOR gate 101-106 selected is latched into a logic high condition.

The unlatching configuration more particularly comprises six interconnecting lines 121-126 corresponding to the six operational modes, and two auxiliary interconnecting lines 127 and 128. The interconnecting lines 121-126 are supplied from output networks of the NOR gates 101-106 through resistors 131-136 connected to corresponding ones of the series output resistors 111-116. By way of example, each of the resistors 131-136 has a resistance of 100K ohm.

The interconnection lines 121-126 also comprise input lines for normal mode selection, and thus correspond to the FIG. 1 lines 21-26. These lines 121 and 126 are active high logic lines and, in general, are connected to inputs of all of the NOR gates 101-106 except the one gate corresponding to the particular mode selected. The lines 121-126, as well as the auxiliary lines 127 and 128, have corresponding pull-down resistors 141-148 connected between the respective line and circuit ground 58. By way of example, the resistors 141-148 each have a resistance of 4.7 megohms. Although not shown, for noise immunity purposes each of the lines 121-128 preferably has a bypass capacitor connected to circuit ground 58, in parallel with the corresponding pull-down resistor 141-148. For each of the lines 121-126, a bypass capacitor of 0.02 mfd is suitable, and for each of the two auxiliary lines 127 and 128, a bypass capacitor of 0.001 mfd is suitable.

In normal operation, each of the lines 121-126 is low, except for the one line corresponding to the selected mode of operation, which line is high. Additionally one of the auxiliary lines 127 or 128 is normally high, these auxiliary lines 127 and 128 being supplied through isolation diodes. More particularly, isolation diodes 151, 152 and 153 are connected to supply the auxiliary line 127 from lines 121, 122, and 123, respectively. Similarly, isolation diodes 154, 155 and 156 are connected to supply auxiliary line 128 from lines 124, 125 and 126, respectively. The use of the auxiliary lines 127 and 128, in combinatipn with the isolation diodes 151-156, reduces the number of inputs which would otherwise be required on each of the NOR gates 101-106 in order to produce the desired logic operation.

In operation, momentary actuation of any one of the momentary switches 31-36 momentarily pulls the corresponding line 121-126 high, as well as one of the two auxiliary lines 127-128. This causes at least one input of each of the NOR gates 101-106 to be pulled high, with the exception of the one of the NOR gates 101-106 corresponding to the selected mode. The outputs of all of the NOR gates 101-106 therefore go low, with the exception of the one corresponding to the selected mode. Latching feedback from this particular NOR gate, through the corresponding one of the resistors 131-136, then causes its corresponding input and interconnecting line 121-126 to remain high.

By way of specific example, in the event the "High Cool" switch 32 is activated, the line 122 is momentarily pulled high. Direct input connections from the line 122 to NOR gates 101 and 103 cause the outputs of the gates 101 and 103 to go low. Through isolation diode 152 the auxiliary line 127 goes high. Since line 127 is connected to an input of each of the NOR gates 104, 105 and 106, their outputs are low. Under this condition, the pull-down resistors 141, 142 and 143 pull all three inputs of the NOR gate 102 low, as there is nothing pulling either of these three inputs high. The output of gate 102 therefore goes high. This high output, through resistors 112 and 132 then maintains a logic high condition on the line 122, even after the momentary switch 32 is released.

For providing user indication in the form of visual feedback of the particular mode selected, five light emitting diodes (LED's) 161, 162 and 164-166 are provided, there being no LED corresponding to the "HOLD" (or "OFF") mode. In particular, the cathode of each of the LED's 161, 162 and 164-166 is connected to the output of a corresponding CMOS digital logic inverter 171, 172, 174-176 through a corresponding current-limiting resistor 181, 182 or 184-186. The anodes of each of the LED's are connected to +12 VDC. Thus, when the output of the corresponding inverter 171, 172, 174-176 goes low, the corresponding LED is activated. The inverter inputs are connected through input resistors 191, 192, 194-196 to corresponding output lines LC, HC, LH, HH and FAN ONLY. Typically, these input resistors 191, 192, 194-196 each have a resistance of 2.0 megohms, and the output current limiting resistors 181, 182, 184-186 in series with the LED's each have an exemplary resistance of 1K ohm. The inverters 171, 172, 174-176 may be included within a single Type No. 4069 CMOS hex inverter package, supplied from the +12 VDC supply as indicated by the +12 VDC connection to the inverter 171 and by the ground connection 58 to the inverter 176.

The exemplary interface circuitry 42 of FIG. 2 comprises a "Cool" OR gate 201, a "Heat" OR gate 202, a "Fan Low" OR gate 203, and a "Hold" gate 204 which functions simply as a buffer supplying a HOLD' line.

These gates 201-204 may comprise CMOS digital logic devices included within a single Type No. CD4071 Quad two-input OR gate integrated circuit package. The buffer gate 204 comprises an OR gate with one input tied to logic low.

The gates 201-204 comprising the interface circuitry 42 are appropriately connected through current limiting resistors 205-209 to the outputs of the mode selection memory 14. By way of example, the resistors 205-209 each have a resistance of 2.0 megohm. For noise immunity purposes, exemplary 0.02 mfd bypass capacitors 210 are connected from each of the lines LC, HC, HOLD, LH and HH to circuit ground, preferably on the interface circuitry 42 side of a connector arrangement (not shown).

It will be appreciated that the particular logic arrangement of the interfacing circuitry 42 is highly dependent upon the requirements of the particular air conditioning unit 12, and the manner in which its various compressors, auxiliary heaters, heat pump changeover valves, and fan relays are connected.

The mode selection memory 14 includes inputs, comprising the connection 70, corresponding to each of the selectable user power up modes, in this particular case, "High Cool", "High Heat", and "HOLD". Advantageously, in the particular circuit ilustrated these inputs represented by the connection 70 comprise three conductors 212, 213 and 215 connected to the output networks of the NOR gates 102, 103 and 105, respectively. Thus, a momentary logic high applied to any one of these lines 212, 213 or 215 has the effect, through the corresponding fedback resistor 132, 133 or 135, of pulling the corresponding interconnecting input line 122, 123 or 125 high, to cause the same result as actual user actuation of the "High Cool" switch 32, the "OFF" switch 33, or the "High Heat" switch 35.

In this particular power on reset circuit arrangement, the +12 VDC supply line serves as a circuit reference potential, although in other specific circuits other lines might equally well be employed, for example, circuit ground. It will be appreciated that the +12 VDC line maintains a steady +12 volts when power is available, and decays to zero volts in the event of a power failure.

The power on reset circuit 68 includes a series differentiating capacitor 220 hving one terminal 222 connected to the circuit reference potential conductor (+12 VDC). The user operable power-up mode selection switch 72 comprises a SP3T switch arranged to selectively connect the other terminal 224 of the capacitor 220 to the memory inputs 212, 213 or 215 corresponding to the user power-up mode selections, In order to ensure discharge of the capacitor upon power failure, a resistor 226 is connected in parallel with the capacitor 220. By way of example, the capacitor 220 has a capacitance of 4.7 mfd, and the resistor 226 has a resistance of 22.0 megohms. With these component values, the capacitor 220 discharges in approximately two minutes. In order to prevent the capacitor 220 from feeding voltage of negative polarity into the circuit in the event of a power failure, an isolation diode 228 is connected in series between the capacitor 220 terminal 224 and the user power up mode selection switch 72.

In operation, assuming the circuit is de-energized, the capacitor 220 is discharged. Upon initial powering up of the circuit 10, the terminal 222 of the capacitor 220 immediately becomes positive by virture of direct connection to +12 VDC. A momentary logic high pulse is conducted through the capacitor 220, the diode 228, and the power up mode selector switch to one of the lines 212, 213 or 215, causing the memory circuit 14 to immediately latch in the particular mode selected. The output of the particular NOR gate 102, 103 or 105 and therefore the line HC, HOLD, or HH corresponding to the selected mode are then high, with all the other NOR gate outputs low. The capacitor 220 is partially charged.

Thus, it will be appreciated that the capacitor 220 in combination with one of the feedback resistors 132, 133 or 135 functions as a differentiator to apply a momentary high pulse.

Following such restoration of power and operation of the power on reset circuit 68, the power on reset circuit 68 has no further effect. With the line HC, HOLD, or HH selected by the user power up mode switch 72 high, the capacitor 220 cannot be further charged because the isolation diode 228 is reverse biased. The capacitor 220 then discharges through the parallel resistor 226 over a period of several minutes until the voltage across the capacitor 220 is zero. In the event the user, by means of one of the user mode selection switches 31-36, immediately selects another mode, the output of the NOR gate 101-106 which had been activated by the power on reset circuit immediately goes low, and the power on reset capacitor 220 then rapidly charges with no adverse effect through the corresponding output resistor 111-116 which, as noted above, each have an exemplary resistance of 10K ohm.

So long as DC power is continuously supplied to the circuitry it will be appreciated that the power on reset circuit 68 has no efect, and the mode selection input switches 31-36 function normally regardless of the position of the user power up mode switch 72.

From the foregoing it will be appreciated that the present invention provides effective user power up mode switch which allows a user to choose the mode of operation which an air conditioning unit, such as a reversible heat pump, assumes during power up following a power interruption. Thus, inappropriate operation following a power outage can be prevented, even though momentary type user mode selection touch switches, such as membrane touch switches, are employed for a normal user mode selection.

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An electronic control system for an air conditioning unit having a plurality of operational modes, said control system adapted for operation from a power source subject to interruption, and comprising:
    a volatile mode selection memory capable of storing representations corresponding to each of the operational modes, said memory having mode selection inputs responsive to momentary actuations;
    an operative connection between said memory and the air conditioning unit to effect operation of the air conditioning unit in the mode corresponding to any particular stored representation; and
    a power on reset circuit connected to said mode selection memory and arranged to cause the air conditioning unit to resume operation in a particular selected mode upon restoration of power following a power interruption; said power on reset circuit including a user operable power up mode selection switch for allowing user selection of the particular mode in which operation resumes, the user power up mode selections including at least a plurality of the operational modes.

2. An electronic control system in accordance with claim 1, wherein the user power up mode selections do not include all of the operational modes.

3. An electronic control system in accordance with claim 2, wherein the operational modes include Low Heat, High Heat, Low Cool, High Cool, Fan Only and Off modes, and wherein the user power-up mode selections include one of the heat mode, one of the cool modes, and the OFF mode.

4. An electronic control system in accordance with claim 3, wherein the user power-up mode selections include the High Heat mode, the High Cool mode, and the Off mode.

5. An electronic control system in accordance with claim 1, which further comprises:

a circuit conductor defining a circuit reference potential; wherein said memory includes an input corresponding to each of the user power up mode selections, each input effective, when connected to the circuit reference potential conductor, to cause operation in the corresponding user power up mode selection; wherein said power up reset circuit includes a capacitor having one terminal connected to the circuit reference potential conductor; and wherein said user operable power up mode selection switch selectively connects the other capacitor terminal to the memory inputs corresponding to the user power up mode selections such that, upon restoration of power, said capacitor momentarily effectively connects a selected power up mode selection input to the circuit reference potential.

* * * * *